OPTICAL SENSOR SYSTEM
Filed Dec. 27, 1967
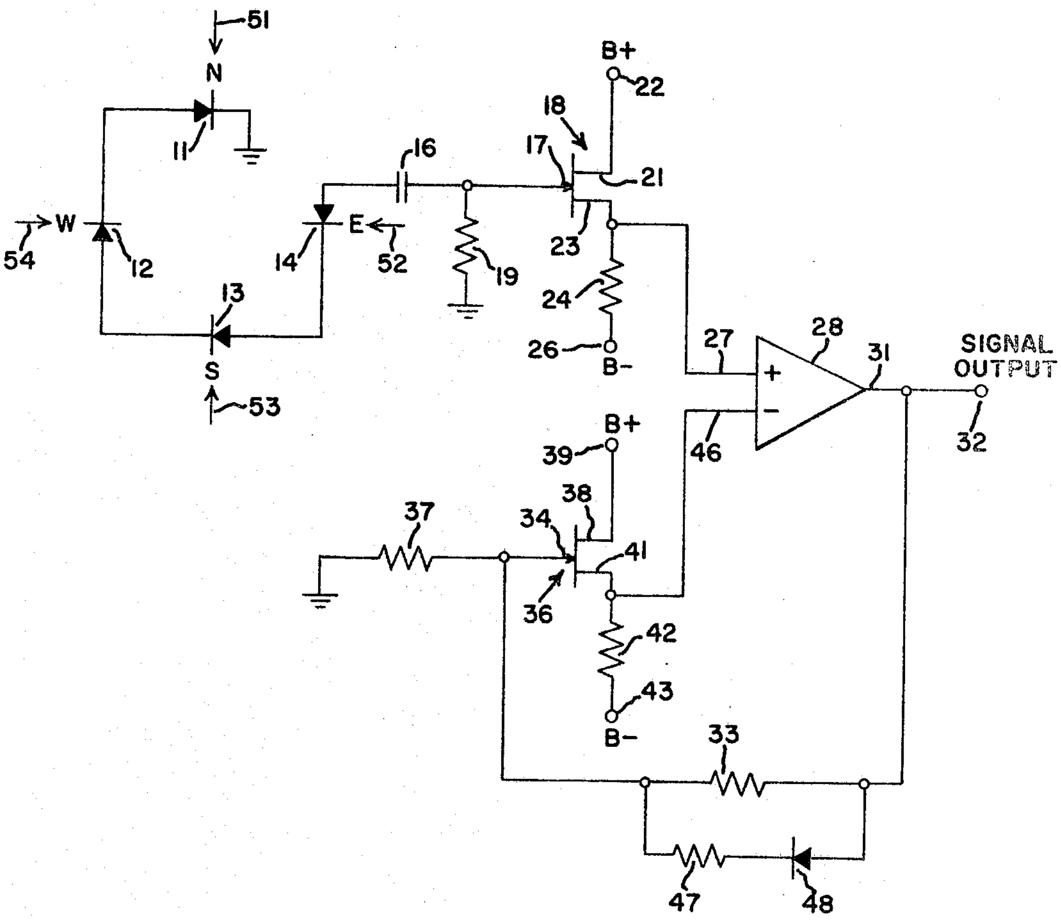
INVENTORS:
RICHARD C. WEISCHEDEL,
PHILIP S. BOOK,
BY Norman C. Fulmer
THEIR ATTORNEY.

3,515,879
Patented June 2, 1970

3,515,879

OPTICAL SENSOR SYSTEM

Richard C. Weischedel, Camillus, N.Y., and Philip S. Book, Devon, Pa., assignors to General Electric Company, a corporation of New York Filed Dec. 27, 1967, Ser. No. 693,861
Int. Cl. H01l 15/00
U.S. Cl. 250—211 4 Claims

ABSTRACT OF THE DISCLOSURE

An optical sensor system is disclosed, comprising a plurality of photodiodes or other photosensitive devices electrically connected in series and physically arranged so that the combination is photosensitive in all directions. This photosensitive arrangement is capacitively coupled to an amplifier having nonlinear gain so as to achieve a wide dynamic operational range. The system is useful, for example, for detecting the occurrence of nuclear detonations.

Background of the invention

Previous omnidirectional systems, for example to detect the occurrence of a nuclear explosion in any direction, have employed a photocell and an optical lens arrangement for directing light or other optical radiation from all directions into the optically sensitive region of the photocell. The photocell was directly coupled to an amplifier having gain-compression feedback for adjusting circuit sensitivity as a function of ambient light (such as daylight, street lights, moonlight, etc.). Such systems are larger and heavier than is desired, and the ambient light circuit sensitivity control undesirably reduces the operational dynamic range of the circuit when the ambient light condition is relatively great.

Summary of the invention

Objects of the invention are to provide an improved optical sensor system, and to overcome the above-described drawbacks of previous arrangements. The improved optical sensor system of the invention comprises, briefly and in a preferred embodiment, a plurality of photosensitive devices, operationally independent of each other, electrically connected in series and physically arranged so that the combination is omnidirectionally photosensitive. An amplifier is capacitively coupled to the series combination of photosensitive devices. Furthermore, to improve the gain, sensitivity, and dynamic operating range, a field effect transistor (FET) is interposed between the coupling capacitor and the amplifier input, and a second field effect transistor having matched or identical characteristics to that of the first FET is interposed in a gain-compression feedback loop for the amplifier.

Brief description of the drawing

The single figure of the drawing is an electrical schematic diagram of a preferred embodiment of the invention.

Description of the preferred embodiment

As shown in the drawing, a plurality of photodiode devices 11, 12, 13, and 14 are connected in electrical series with a capacitor 16, between electrical ground and the gate input electrode 17 of a field effect transistor (FET) 18. A resistor 19 is connected between the gate electrode 17 and electrical ground. An output electrode 21 of the FET 18 is connected to a terminal 22 for positive polarity operating voltage, and another output electrode 23 of the FET 18 is connected via a resistor 24 to a terminal 26 for negative polarity operating voltage, and also is connected to a signal input terminal 27 of an amplifier 28. The output 31 of amplifier 28 is connected to a signal output terminal 32, and also is connected, via a feedback network resistor 33, to the gate electrode 34 of a second FET 36. A resistor 37 is connected between the gate 34 and electrical ground. An output electrode 38 of the FET 36 is connected to a terminal 39 for positive polarity operating voltage, and another output electrode 41 is connected via a resistor 42 to a terminal 43 of negative polarity operating voltage and also is connected to an inverting input 46 of the amplifier 28. That is, the inversion input 46 has a reverse polarity effect in the amplifier from that of the input 27. This is readily achieved, in well-known manner, by connecting the inputs 27 and 46 to different electrodes of the first amplifier tube or transistor in the amplifier 28, or by incorporating a signal inverting amplifier stage for one or the other of the inputs 27 and 46. A resistor 47 and diode 48 are connected in series across the feedback resistor 33, in order to provide a nonlinear feedback network, in well-known manner.

The photodiodes 11, 12, 13, and 14 are physically oriented so as to respond to light or other photo radiation from different directions, independently of each other but connected so that the combination thereof is omnidirectional. To achieve this, the photodiodes may be either close together as a single unitary arrangement, or may be spaced apart such as by being mounted on different sides of an equipment cabinet. The number of photodiodes required for the desired omnidirectional characteristic, will depend upon the angle of photo responsiveness of each device. For example, photodiodes of the type known as silicon voltaic cells each has an effective photosensitive angle of approximately 90 degrees, so that four of them oriented as shown so as to be principally responsive to the four directions North, East, South, and West as respectively indicated by the arrows 51, 52, 53, and 54 will achieve the desired omnidirectional photo response.

Ambient light reaching the photodiodes, such as daylight, street lights, moonlight, etc., although it will generate voltages in the various photodiodes, will not cause any output signal to occur at the output signal terminal 32, because the coupling capacitor 16 blocks any steady ambient voltage generated in the photodiodes. However, when a transient optical event occurs, such as a nuclear detonation, voltages generated in the photodiodes, the individual voltage values of which will depend upon the direction and intensity of the detonation, will add together and be coupled by the capacitor 16, through the FET 18 and to the input 27 of the amplifier 28, thereby producing an output signal at output terminal 32. Since a photodiode, operated in the preferable voltaic mode, has a logarithmic operating characteristic, any ambient light thereon will reduce the sensitivity to transient light signals that it is desired to detect. However, in accordance with the invention, the plurality of photodiodes operate independently of each other, so that a relatively high ambient light level on one of them will not affect the photo sensitivity of the others, hence the overall result is a desirable greater sensitivity to transient signals, in the presence of ambient light, than is the case with the prior art arrangement of a single photocell. For example, the rising sun will reduce the optical sensitivity of the "East" photodiode, but the North, South, and West photodiodes will have substantially maximum sensitivity for transient optical occurrences. Due to the nonlinear feedback network, the gain of the amplifier 28 will be relatively reduced upon the occurrence of relatively large values of transient optical signals. The overall gain of the amplifier 28 with a small signal thus will be approximately $$G=1+\frac{R}{R''}$$

and the gain for a relatively large input signal will be approximately $$G=1+\frac{R'+r}{R''}$$

in which G is the gain of amplifier 28 with the feedback, R is the value of resistor 33, R′ is the resistance value of resistor 47, *r* is the forward resistance of the diode 48, and R″ is the resistance value of the resistor 37. The FET 36 in the feedback path, which is matched in electrical characteristics to that of the FET 18 in the input signal path, insures a balanced operation of the amplifier circuit, thereby improving its gain and dynamic range.

It will readily be realized that the invention achieves its objectives of providing an omnidirectional optical sensor arrangement that is compact, lightweight, and operational over a wide dynamic range of optical input radiation.

While a preferred embodiment of the invention has been shown and described, various other embodiments and modifications thereof will be apparent to those skilled in the art, and will fall within the scope of invention as defined in the following claims.

We claim:

1. An optical sensor system wherein the improvement comprises a plurality of photosensitive devices, each having a limited angle of photosensitivity, connected electrically in series and physically arranged so that the combination thereof is omnidirectionally photosensitive.

2. A system as claimed in claim 1, including an amplifier, and a capacitor series-connected in a signal path between said series-connected photosensitive devices and the signal input terminals of said amplifier.

3. A system as claimed in claim 2, including a field effect transistor interposed between said capacitor and said amplifier, with a base electrode thereof connected to said capacitor and an output electrode thereof connected to a signal input terminal of said amplifier.

4. A system as claimed in claim 3, including a signal feedback path comprising a gain-compression feedback network connected between the output and an input of said amplifier, and a field effect transistor interposed in said signal feedback path with a base electrode thereof connected to said feedback network and an output electrode thereof connected to an input terminal of said amplifier, said field effect transistors having substantially identical electrical characteristics.

References Cited

UNITED STATES PATENTS 3,313,939 4/1967 Spencer.

RODNEY D. BENNETT, Primary Examiner

D. C. KAUFMAN, Assistant Examiner

U.S. Cl. X.R.

250—208